Oct. 7, 1930.  A. J. PRANCE  1,777,380
THREAD CUTTING DIE
Filed March 3, 1928   3 Sheets-Sheet 1
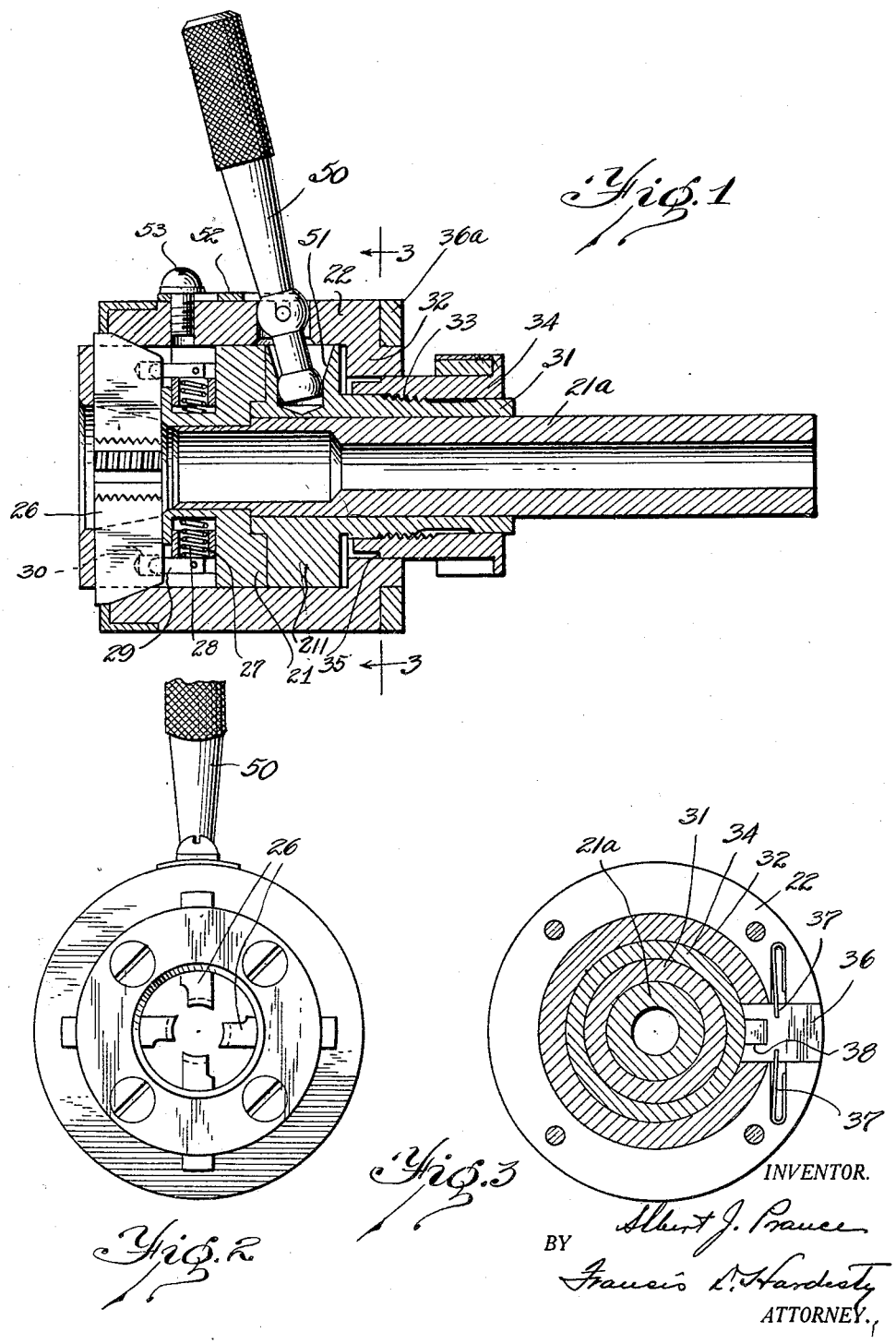

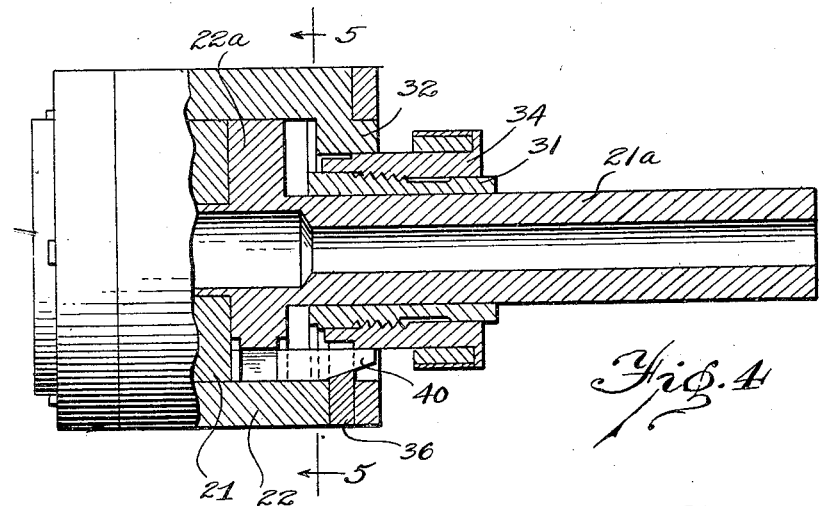
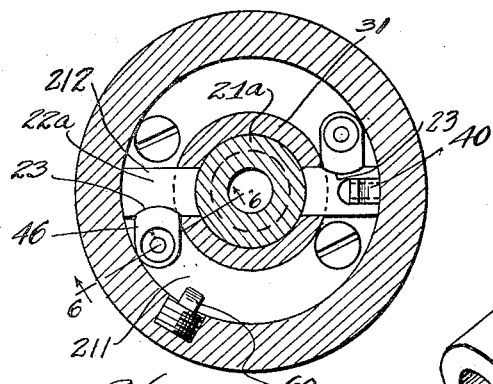
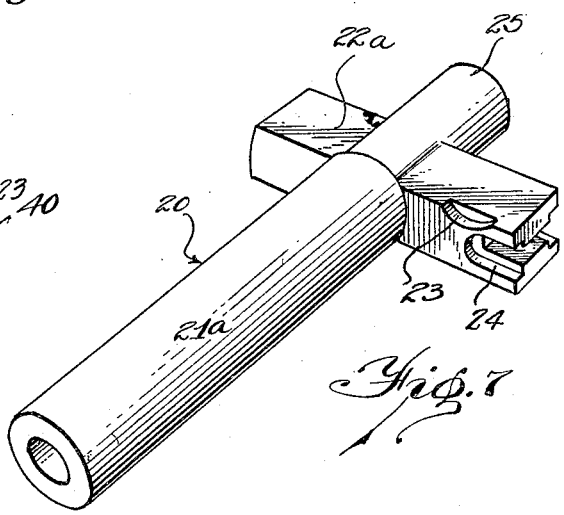
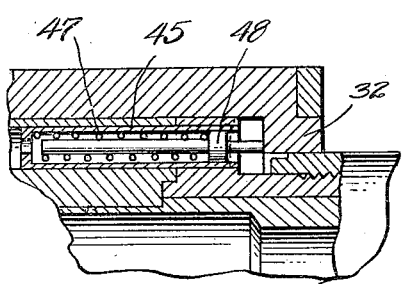
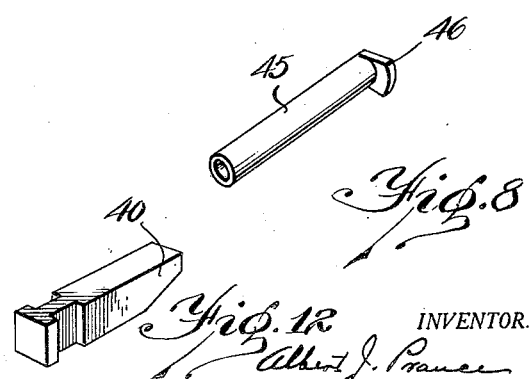
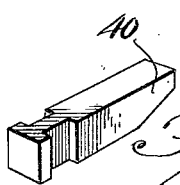

Oct. 7, 1930. A. J. PRANCE 1,777,380
THREAD CUTTING DIE
Filed March 3, 1928   3 Sheets-Sheet 3

INVENTOR.
Albert J. Prance
BY
Francis O. Hardesty
ATTORNEY.

Patented Oct. 7, 1930

1,777,380

UNITED STATES PATENT OFFICE

ALBERT J. PRANCE, OF DETROIT, MICHIGAN, ASSIGNOR TO MURCHEY MACHINE AND TOOL COMPANY, OF DETROIT, MICHIGAN, A CORPORATION OF MICHIGAN

THREAD-CUTTING DIE

Application filed March 3, 1928. Serial No. 258,790.

The present invention relates to thread cutting dies and constitutes an improvement on the inventions set forth in the earlier applications filed in the name of the present inventor and bearing Serial Number 169,470, on Thread cutting die, filed February 19, 1927, and Patent No. 1,655,563, granted January 10, 1928, on Thread cutting die, respectively.

In the earlier forms of dies as described in the before mentioned applications, it was necessary to voluntarily release the chasers from the work at the end of the thread cutting operation.

Among the objects of the present invention is a device for cutting threads which may be constructed and arranged so that at the end of the thread cutting operation, it automatically releases the chasers from the work piece and may then be moved back to clear the work either automatically or manually.

Another object is the provision of a suitable means to return the chasers to thread cutting position quickly and easily and which may be actuated either manually or automatically.

Other objects will readily occur to those skilled in the art upon reference to the following description and the accompanying drawings, in which:—

Figure 1, is a longitudinal section through a thread cutting tool embodying the present invention;

Figure 2, is a front end view of the same;

Figure 3, is a section on line 3—3 of Figure 1;

Figure 4, is a second longitudinal section taken at right angles to the section shown in Figure 1;

Figure 5, is a section on line 5—5 of Figure 4;

Figure 6, is a section on line 6—6 of Figure 5;

Figures 7 and 8 are perspective views of certain of the parts of the device;

Fig. 12 is a perspective view of a detail.

Figure 9:
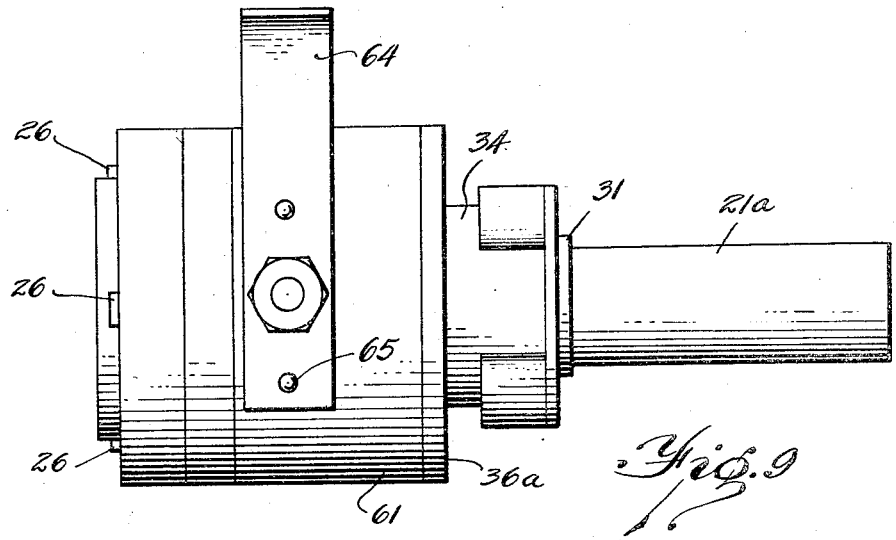
Figure 9, is a side elevation of a modified form of the thread cutting tool.

The drawings show the present device to consist chiefly of an arbor 20 and sleeve 21 which will be referred to as the chaser holder and an outside sleeve member 22 which will be termed the adjusting sleeve.

The arbor member is shown in perspective in Figure 7 as consisting of a shaft portion $21^a$ having a cross head $22^a$, which cross head is provided with seats 23, of which there are two, one on each portion of the cross head, and a slot or notch 24 in one end thereof.

The chase holder 21 consists of a cylindrical member bored axially to receive the small end 25 of the arbor 20 and slotted radially at one end to receive the chasers 26, of which four are shown. These chasers are beveled at their outer ends to coact with the adjusting sleeve 22 as will be described. Immediately back of the chaser slots, the sleeve is bored radially for the reception of the plungers 27 adapted to be spring pressed outwardly by means of a spring 28 and each carrying a hinged finger 29 adapted to enter a recess 30 in a chaser. Through the action of the springs 28, the chasers tend to move radially outward and when released, as will be described later, move radially away from the work. To the rear end of the chaser holder cylinder is secured an extension member 211 with a diametric slot 212 for the reception of the cross head $22^a$ of the arbor member, and slot is sufficiently deep to permit a small movement of the cross head therein for a purpose to be described later.

The outside sleeve 22, or adjusting sleeve, is a substantially smooth hollow cylindrical member with an inturned flange 32 at its rear end and is adapted to receive the chaser holder 21 in one end, the inturned flange portion 32 preventing the passage of chaser holder and other parts associated therewith through the rear end. The front end of sleeve 22 is provided with a sloping surface coacting with the beveled ends of the chasers and thereby fixing the radial adjustment of chasers according to the axial adjustment of the sleeve. The opening in the rear end of the adjusting sleeve 22 is somewhat larger than the shank of the arbor member 20 for the passage of a continuation 31 of the chaser holder extension 211 which continuation is threaded, as shown at 33, for the reception of an adjusting nut 34. This, together with the continuation 31 fits within the opening in the flange 32.

The adjusting nut 34 is formed with a shoulder 35 near its inner end and this shoulder is adapted to coact with a retaining dog 36 carried in the adjusting sleeve 22 and maintained therein by ring 36ª. Through the coaction of the dog 36 and the shoulder 35 the extreme forward position of the adjusting nut 34 is accurately regulated as will be seen in Fig. 4, dog 36 being loosely clamped between sleeve 22 and ring 36ª serving to prevent further forward movement of the nut 34.

The dog 36 consists of a small plate, as shown in Figure 3, having a slotted inner end 38 and provided with notches in its side for the reception of the ends of springs 37 tending to move the dog radially inward. The slotted inner end 38 coacts with a cam releasing member 40 carried in the notch or slot 24 in the cross head of the arbor member and is fixed against longitudinal movement therein so that when the arbor member 20 is moved, it carries with it the cam piece 40.

As shown in Figures 5 and 6, the chaser holder 21 is provided with longitudinal sockets extending from the rear end to near the front end, being closed at the front end, and in these sockets are adapted to slide the sleeves 45 extending through the chaser holder 21 and extension 211, and each provided with a lip 46 which coacts with a seat 23 in the cross head of arbor member 20. In the sleeves 45 are springs 47 adapted to press outwardly the plungers 48 which press against the inner surface of flange 32. This structure is shown best in Figures 5 and 6. The two springs pressed plungers are so arranged as to cause the sleeve 22 to move longitudinally of the arbor member when the dog 36 is released from the shoulder 35 by means of the cam piece 40.

In the use of the present device, the work piece will be fixed in a suitable rotating holder and held thereby against longitudinal movement. The thread cutting device will be supported by means of the arbor 20 in a carriage and held thereby against rotation and the carriage so arranged as to move the die longitudinally toward the work. The chasers engage with the work piece and cut threads thereon, being fed at a suitable rate until within a short distance of the desired end of the thread. When this position has been reached, the carriage for the device is stopped and the rotation of the work piece continued. When this is done, the chasers continue to cut the work piece and being threaded thereon pull the chaser holder 21 and chasers toward it. When the chaser holder is moved longitudinally (toward the left of Figure 1) with the arbor, the shoulder 35 forces the dog 36 along with it and along the inclined surface on cam member 40, best disclosed in Fig. 4. This movement continues until the dog 36 is lifted from behind the shoulder 35, whereupon the springs and plungers 48 acting upon the adjusting sleeve force the latter back upon the arbor (that is toward the right of Figure 1) and the chasers are thereby released from the work and the device may then be moved bodily away from the latter.

In order to return the chasers and sleeve 22 to cutting position, a lever 50 may be pivoted in the wall of sleeve 22 and extend in to a suitable socket 51 in the extension portion of chaser holder 21. At 52 is shown a plate serving to prevent the lever from coming out, which plate is secured by means of a screw 53.

Figure 10:
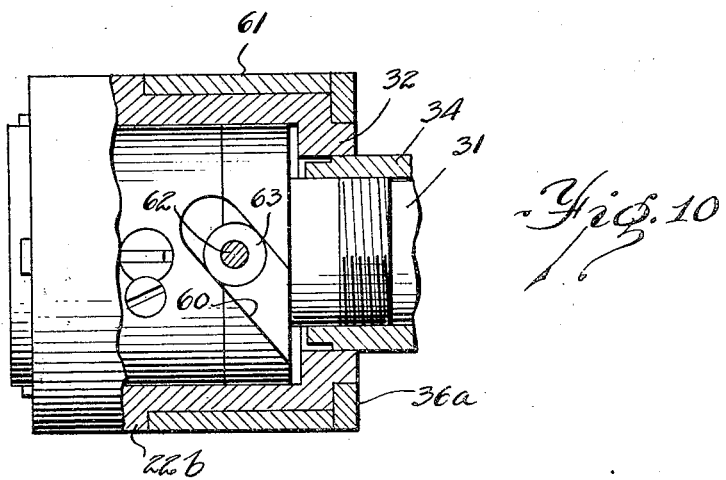
Figures 10 and 11 are sections through the tool of Figure 9 showing certain differences over that of Figure 1.
Figure 11:
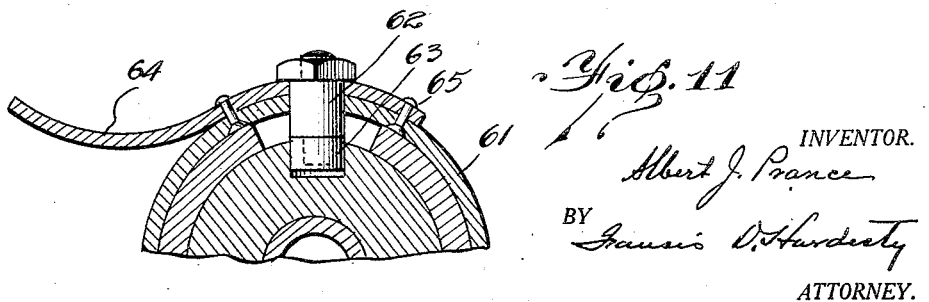

In Figures 9, 10 and 11, there is shown a thread cutting die which is similar in construction to the one just described, except that a different means is provided for the return of the parts to thread cutting position.

Instead of using a lever such as lever 50, a spiral slot 60 is cut in the wall of the chaser holder and a collar 61 mounted on the outside of the adjusting sleeve 22ᵇ which collar is provided with a stud 62 extending through the sleeve 22ᵇ and carrying a roller 63 co-acting with the spiral slot so that when the collar 61 is partially rotated, the roller acting with the slot 60 causes longitudnal movement of the sleeve 22ᵇ toward the cutting end of the device.

In order to facilitate this rotary movement a projecting member 64 may be secured to the collar as by rivets 65. The operation of this device is the same as the operation of the previously described one, except that instead of a longitudinal movement of the lever to cause the return of the adjusting sleeve, a rotary movement is given the projecting member 64 for the same purpose.

In either form of the device the sleeve 22 may be prevented from rotation relative to the chaser holder by an inwardly projecting key 60 coacting with a suitable slot in the chaser holder.

Now having described the invention and the preferred forms of embodiment thereof it is to be understood that the said invention is to be limited, not to the specific details herein described but, only by the scope of the claims which follow.

I claim:—

1. In a thread cutting die, an arbor having a cross head integral therewith, a chaser holding sleeve mounted on said arbor and having an extension thereon provided with slots for the reception of said cross head, said slots being of such size as to permit limited longitudinal movement of said cross head therein, an adjusting sleeve carried by said chaser holder, an adjustable abutment carried by said chaser holder, a retaining dog carried by said adjusting sleeve and adapted to coact with said abutment to fix said chaser holder and sleeve in relative position, and means carried by said cross head adapted to release said fixing means upon relative movement between said chaser holder and said cross head.

2. In a thread cutting die, an arbor adapted to be fixed in a suitable carriage for longitudinal movement toward and away from the work, a cross head on said arbor, a chaser holder on said arbor and having an extension which is slotted for the reception of said cross head, a chaser adjusting sleeve carried by said chaser holder and provided with a dog and adapted to coact with a portion of said chaser holder for adjustment of the chasers therein, said dog being provided with a slotted inner end, a cam piece carried by said cross head and adapted to slide in said notch, and springs in said chaser holder tending to move said chaser holder and sleeve relatively when said dog is released, said cam member being adapted to move said dog radially outward upon relative movement of said cross head and chaser holder whereby to release said adjusting sleeve and permit it to be moved by said springs to chaser releasing position.

3. In a die for cutting threads upon an object, thread cutting chasers, an arbor having a cross head, a chaser holder, mounted on said arbor and having an extension thereon provided with slots for the reception of the cross head, the slots and cross head cooperating to limit the movement of the holder and arbor with respect to each other, a chaser adjusting sleeve movably mounted on said arbor, an abutment on said arbor and a dog adapted to move said sleeve along therewith forwardly toward the object, said dog serving to prevent said sleeve from moving rearwardly away from the object independently of said chaser holder and arbor, a cam adapted to release said dog upon movement of said holder forwardly upon the object to its extreme cutting position, and spring means adapted to move said sleeve rearwardly along the arbor and holder to release the chasers upon release of said dog.

ALBERT J. PRANCE.